United States Patent
Palakodati et al.

(10) Patent No.: US 6,705,421 B2
(45) Date of Patent: Mar. 16, 2004

(54) ASSISTED STEERING SYSTEM WITH OUT-OF-PHASE DRIVER AND ASSIST PINIONS

(75) Inventors: Sunil Palakodati, Canton, MI (US); James Richard Robertson, Walled Lake, MI (US); Madhu Nambiar, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/161,412

(22) Filed: May 31, 2002

(65) Prior Publication Data

US 2003/0221895 A1 Dec. 4, 2003

(51) Int. Cl.[7] .................................................. B62D 5/04
(52) U.S. Cl. ....................................... 180/444; 180/443
(58) Field of Search ................................ 180/443, 444, 180/446; 74/388 PS, 422

(56) References Cited

U.S. PATENT DOCUMENTS

| | | | |
|---|---|---|---|
| 4,739,855 A | 4/1988 | Miyoshi et al. | 180/142 |
| 4,753,308 A | 6/1988 | Noto et al. | 180/79.1 |
| 4,793,433 A | 12/1988 | Emori et al. | 180/143 |
| 4,805,939 A | 2/1989 | Kanazawa et al. | 280/91 |
| 4,880,074 A * | 11/1989 | Matsumoto | 180/444 |
| 5,392,875 A | 2/1995 | Duffy | 180/132 |
| 5,412,530 A | 5/1995 | Shimizu | 361/185 |
| 5,775,459 A * | 7/1998 | Jorg et al. | 180/444 |
| 5,845,222 A | 12/1998 | Yamamoto et al. | 701/41 |
| 5,988,310 A | 11/1999 | Nishino et al. | 180/443 |
| 6,072,293 A | 6/2000 | Shimizu et al. | 318/432 |
| 6,268,708 B1 | 7/2001 | Kawada et al. | 318/430 |
| 6,419,043 B1 * | 7/2002 | Duval et al. | 180/444 |
| 6,543,568 B2 * | 4/2003 | Cole | 180/428 |
| 6,564,898 B2 * | 5/2003 | Takehara et al. | 180/444 |

FOREIGN PATENT DOCUMENTS

| | | |
|---|---|---|
| EP | 1215102 A2 | 6/2002 |
| GB | 2354989 A | 4/2001 |

* cited by examiner

Primary Examiner—Lesley D. Morris
Assistant Examiner—L. Lum
(74) Attorney, Agent, or Firm—Brinks Hofer Gilson & Lione

(57) ABSTRACT

An assisted steering system is provided. In preferred embodiments, the system has driver and assist pinions that are out of phase with each other. As a tooth of the driver pinion is fully engaged with a rack tooth, a tooth of the assist pinion is only partially engaged with a tooth of the rack. Preferably, the driver and assist pinions have differing rack speeds and numbers of teeth.

16 Claims, 5 Drawing Sheets

ASSISTED STEERING SYSTEM WITH OUT-OF-PHASE DRIVER AND ASSIST PINIONS

FIELD OF THE INVENTION

The present invention relates generally to EPAS systems. More specifically, the present invention relates to rack and pinion configurations for optimizing EPAS systems.

BACKGROUND OF THE INVENTION

The prior art provides various examples of assisted steering systems. These systems, no matter the mode of operation, serve to assist manual steering by a driver of a vehicle in order to facilitate steering of the vehicle. The most common type of assisted steering system utilizes hydraulics. These systems have several disadvantages that arise due to their use of hydraulic systems. For example, they require the use of a hydraulic pump that is typically connected to the engine. This arrangement can reduce engine power and fuel efficiency.

Electric power assisted steering (EPAS) systems include the use of an electric motor and various sensors. These systems assist manual steering by sensing the initiation of steering by a driver and assisting the steering through activation of the motor. The motor typically drives an assist pinion that facilitates movement of a rack. EPAS systems provide several advantages, such as the elimination of the hydraulics associated with other types of power steering.

EPAS systems, however, still have several drawbacks. For example, while these systems eliminate hydraulics, mechanical interactions between components are an integral part of the systems. Most conventional EPAS systems use a dual pinion configuration in which a driver pinion and an assist pinion interact with a rack to affect steering. The driver pinion is connected to the steering wheel while the assist pinion is connected to the electric motor. Both pinions mechanically engage the rack through interaction of gear sets on the rack and pinions. As with any gear set, an engagement pulse is produced each time a pinion tooth engages a rack tooth. Engagement pulses produce a jerking motion that can travel throughout the steering system due to the interconnection of all parts. Because the systems utilize two pinions, the engagement pulses, when overlapping, can amplify, increasing the jerking in the system.

SUMMARY OF THE INVENTION

The present invention provides an EPAS system with dual pinions that are placed out of phase relative to each other. That is, the EPAS system according to the present invention has an assist pinion that is out of phase with the driver pinion. When one pinion is fully engaged with one or more teeth of the rack, the other pinion is partially engaged with one or more teeth of the rack. As a result the amplification problem is avoided. Indeed, an engagement pulse of one pinion can be minimized due to the lack of an engagement pulse of the other pinion at a particular time. Consequently, in contrast to the additive effect of engagement pulses found in prior art systems, the engagement pulses associated with the EPAS system of the present invention can be minimized or canceled. This, in turn, minimizes or eliminates the jerking in the steering system.

In one preferred embodiment, the present invention provides an EPAS system comprising a rack having first and second sets of rack teeth, a driver pinion having a set of driver teeth, and an assist pinion having a set of assist teeth. The assist teeth are only partially engaged with one or more rack teeth while the driver teeth are fully engaged with one or more rack teeth.

In any given steering system, various parameters determine the details of the componentry utilized. For example, driver rack speed, number of driver pinion teeth, number of assist pinion teeth, and the assist rack speed all affect each other. The EPAS system of the present invention is produced by optimizing three of these parameters based on a given fourth parameter.

Accordingly, the present invention also provides a method of supplying an EPAS system to a customer. In a preferred embodiment, the method comprises obtaining a desired driver rack speed from the customer. This number is related to a desired steering ratio for a particular vehicle into which the steering system will be incorporated. Next, the method includes optimizing the number of driver teeth, the number of assist teeth, and the assist rack speed such that a driver pinion and an assist pinion are placed out of phase with each other.

While the invention is defined by the claims appended hereto, additional understanding of the invention can be obtained by referencing the following detailed description of preferred embodiments and the appended drawings.

DETAILED DESCRIPTION OF A PREFERRED EMBODIMENT OF THE PRESENT INVENTION

The following description of a preferred embodiment provides an example of the present invention. The embodiment discussed herein is merely exemplary in nature, and is not intended to limit the scope of the invention in any manner. Rather, the description of the preferred embodiment serves to enable a person of ordinary skill in the relevant art to make, use and perform the present invention.

Figure 1:
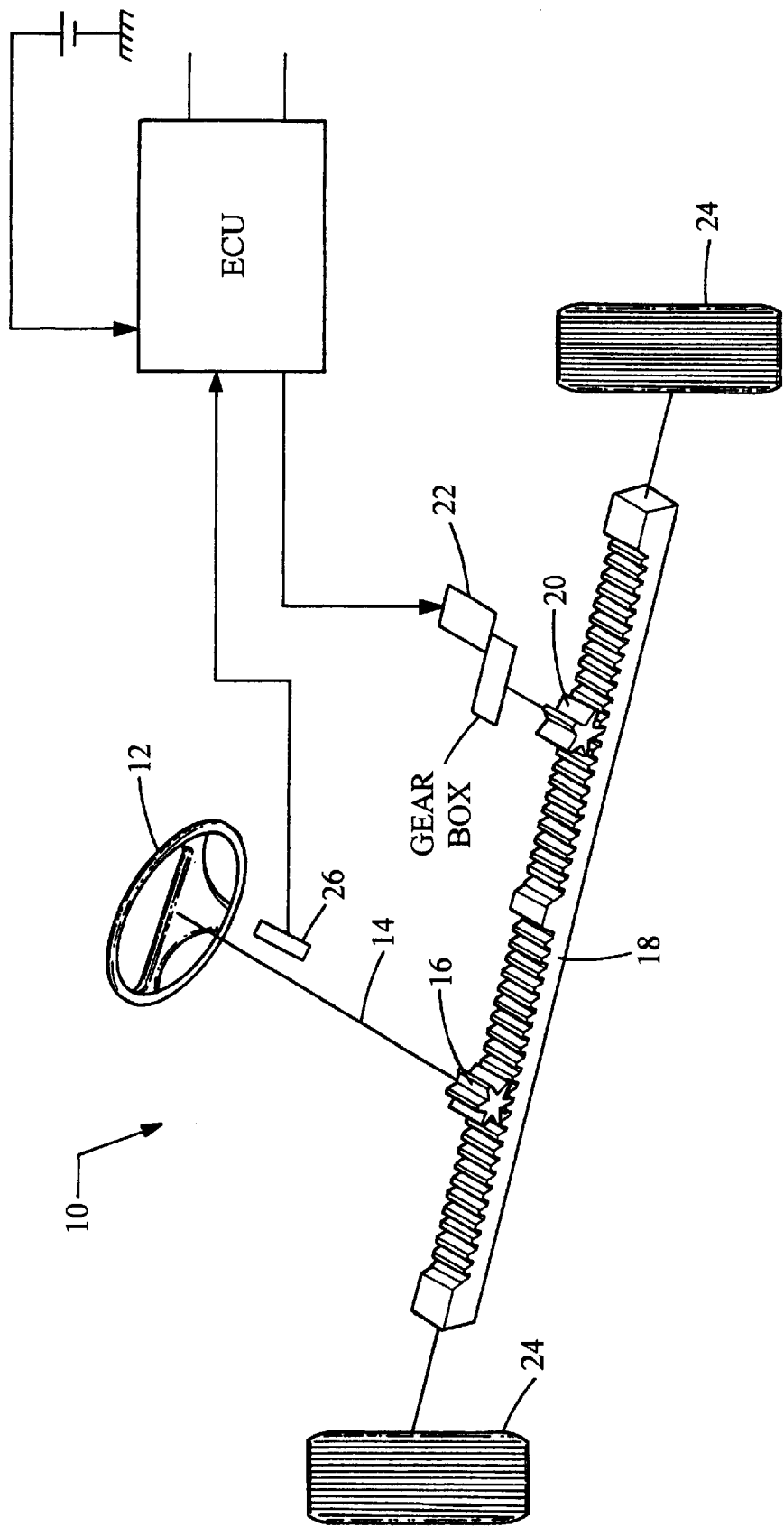
FIG. 1 is a schematic of EPAS system according to a preferred embodiment of the present invention.

FIG. 1 illustrates an EPAS system according to a preferred embodiment of the present invention. As illustrated in the Figure, the system 10 includes a steering wheel 12 connected to a steering shaft 14. The shaft 14 terminates at a driver pinion 16. The driver pinion 16 is geared to interact with a rack 18. An assist pinion 20 is also geared to interact with the rack 18. A means for inducing alternating engagement and disengagement of the assist pinion 20 with the rack 18, such as electric motor 22, is operably connected to the assist pinion 20 and provides the assist function of the system. Ultimately, the rack 18 is operably connected to wheels 24. Various means for controlling the means for inducing, such as sensors 26 may be included in the system 10. The means for controlling preferably comprise a sensor adapted to detect a positional characteristic, such as steering angle, of the steering wheel 12 and/or the steering shaft 14.

In operation, a driver rotates steering wheel 12, thereby engaging movement of rack 18 via the steering shaft 14 and driver pinion 16. Simultaneously, sensor 26 detects the initiation of the steering wheel 12 and engages electric motor 22. The electric motor 22 induces rotation of the assist pinion 20, thereby assisting in movement of the rack 18. Ultimately, wheels 24 are steered in a desired direction.

Figure 2:
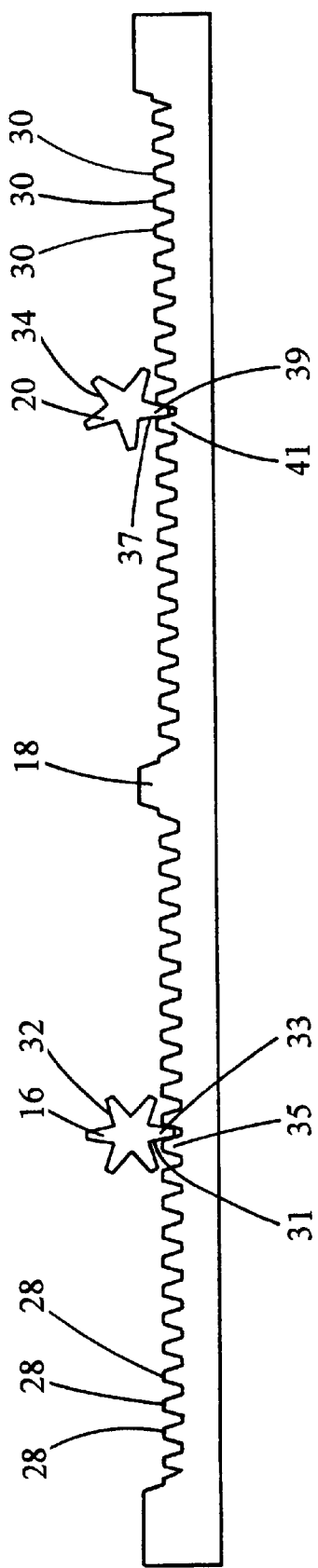
FIG. 2 is a plan view of the rack and pinions of the EPAS system illustrated in FIG. 1.

FIG. 2 illustrates the interaction between the driver 16 and assist 20 pinions and the rack 18 of the EPAS system 10 according to the present invention. As illustrated in the Figure, the rack 18 defines first 28 and second 30 pluralities of rack teeth. These teeth 28, 30 can be any suitable gear teeth configuration known to those skilled in the art. Also, driver pinion 16 defines a plurality of driver pinion teeth 32. Likewise, assist pinion 20 defines a plurality of assist pinion teeth 34.

Both the driver 16 and assist 20 pinions interact with the rack 18 in a typical geared interaction. Thus, the driver pinion teeth 32 engage the first plurality of rack teeth 28 upon rotation of the driver pinion 16. Also, the assist pinion teeth 34 engage the second plurality of rack teeth 30 upon rotation of the assist pinion 20. As a result of these geared interactions, rotational movement of the driver 16 or assist 20 pinions is translated into linear movement of the rack 18.

Figure 3:
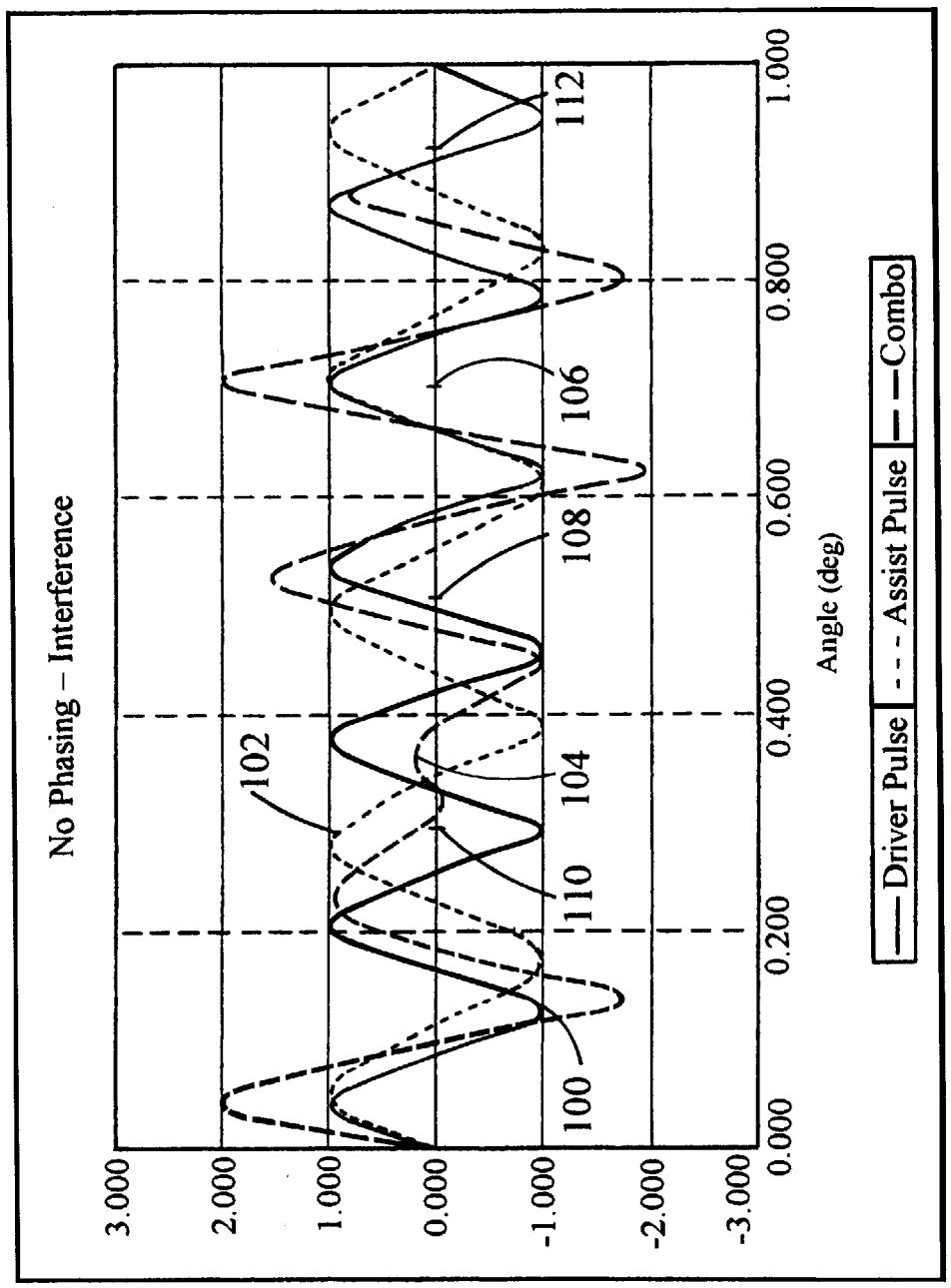
FIG. 3 is a graph illustrating engagement pulses in a prior art EPAS system.

As indicated above, conventional dual pinion EPAS systems have driver and assist pinions that produce additive engagement pulses on the rack and throughout the system. FIG. 3 presents a graphical illustration of this effect. The graph represents and EPAS system that does not include pinions that are out of phase with each other. The graph illustrates the magnitude of engagement pulses for a driver pinion (data series 100), an assist pinion (data series 102), and the combined pulse based on these two series (data series 104). In the graph, the X-axis represents fraction of rotation of the pinion, while the Y-axis represents arbitrary units of force. As illustrated in the graph, when the engagement forces of the two pinions are directly in-phase, such as at point 106, or overlapping, such as at point 108, an additive effect occurs. However, because the pinions have differing rack speeds, they will occasionally be out of phase with each other. When the pulses are out of phase with each other, such as at points 110 and 112, minimizing or cancellation effect occurs. The EPAS system according to the present invention avoids the amplification problem illustrated in FIG. 3 by placing the driver and assist pinions out of phase with each other. As best illustrated in FIG. 2, the pinions 16, 20 are arranged in relation to the rack 18 such that at least one of the driver pinion teeth 32 fully engage a tooth of the first plurality of rack teeth 28 only when at least one of the assist pinion teeth 34 is not fully engaged with a tooth of the second plurality of rack teeth 30. Similarly, at least one of the assist pinion teeth 34 only fully engage a tooth of the second plurality of rack teeth 30 only when at least one of the driver pinion teeth 32 is not fully engaged with a tooth of the first plurality of rack teeth 28.

As best illustrated in FIG. 2, a side 31 of a tooth 33 of the driver pinion teeth is preferably in continuous contact with the portion of the rack tooth 35 that is adjacent the driver pinion tooth 33. Also, at the same time, a side 37 of an assist pinion tooth 39 is preferably only partially contacted with the portion of the rack tooth 41 that is adjacent the assist pinion tooth 39. Of course, as the pinions 16, 20 rotate and the rack 18 moves linearly, the engagement and disengagement between the pinions 16, 20 and the rack 18 will vary. Importantly, at any given time, only one of a driver pinion tooth or one of an assist pinion tooth can be in continuous contact with an adjacent portion of a rack tooth. The other will only be in partial contact with an adjacent portion of a rack tooth. More specifically, at least one driver pinion tooth defines first and second side surfaces. At least one assist pinion tooth defines third and fourth side surfaces. At least one of the first set of rack teeth defines a fifth side surface and at least one of the second set of rack teeth defines a sixth side surface. The first side surface is in continuous contact with a portion of the fifth side surface that is adjacent the at least one driver pinion tooth. The third side surface is only partially in contact with a portion of the sixth side surface that is adjacent the at least one assist pinion tooth.

To achieve the desired out-of-phase configuration, the driver 16 and assist 20 pinions preferably have structural and functional differences. Preferably, as best illustrated in FIG. 2, the driver 16 and assist 20 pinions, have differing numbers of teeth. Also preferable, the driver 16 and assist 20 pinions preferably have differing rack speeds.

Figure 4:
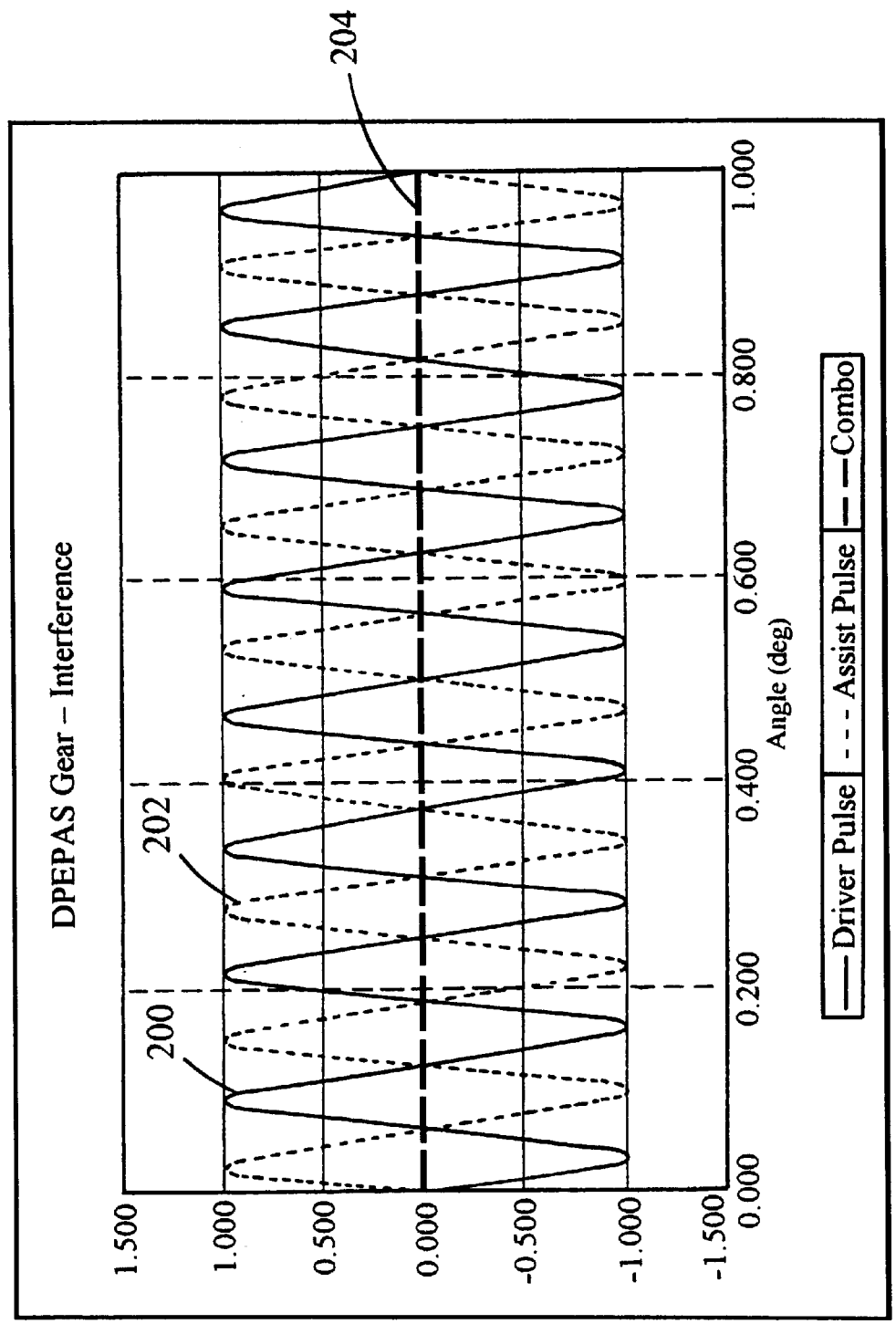
FIG. 4 is a graph illustrating complete cancellation of engagement pulses in an EPAS system according to the present invention.
Figure 5:
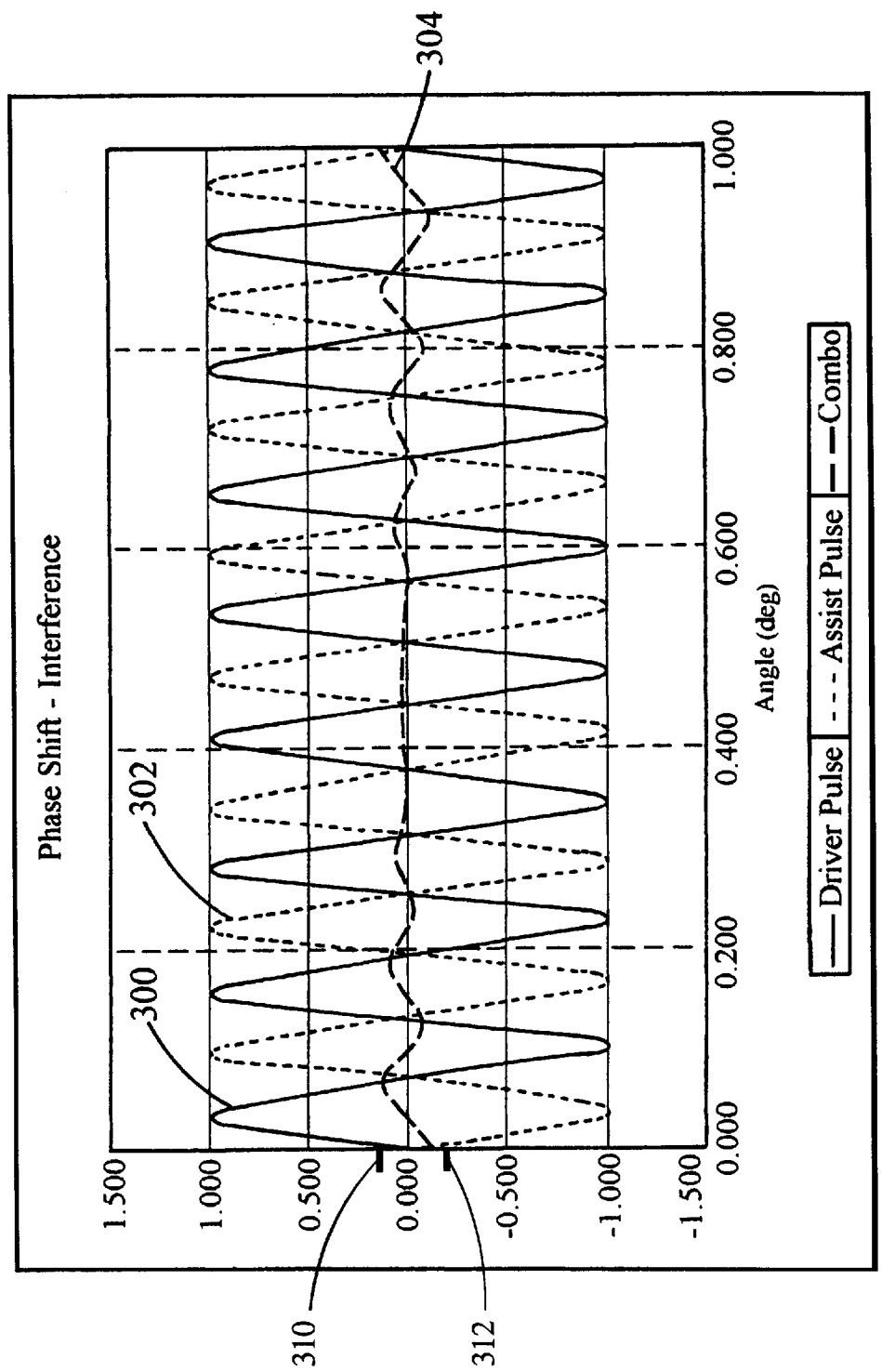
FIG. 5 is a graph illustrating engagement pulses within an acceptable tolerance in accordance with the present invention.

FIGS. 4 and 5 illustrate data corresponding to EPAS systems designed according to the present invention. In each of these figures, similar reference numbers refer to similar features of the graph in FIG. 3. Also, the X and Y axes are the same as those in FIG. 3. FIG. 4 represents a system with two pinions (data series 200, 202) directly out of phase along their entire rotational path. As is illustrated in the graph, this arrangement produces a total cancellation of engagement pulses (data series 204). Due to the limitations of gear design and manufacturing, this ideal arrangement may not always be achieved. FIG. 5 illustrates a system in which the additive effect is significantly minimized (data series 304) by two pinions that are out of phase (data series 300, 302) while some additive effect still occurs, it is limited to a particular tolerance. (Y-valves 310, 312).

The present invention also provides methods of supplying components for an EPAS system. As indicated above, the design of each component in the system affects the configuration of the other components. Accordingly, given the configuration of one component, the remaining components can be optimized to produce a rack and dual pinion set for incorporation into an EPAS system in accordance with the present invention.

In a preferred embodiment, the method includes obtaining a desired rack speed from a customer as a first step. As in known in the art "rack speed" refers to distance movement of a rack per revolution of pinion. Next, optimal combinations of the other parameters (assist rack speed, number of assist teeth, number of driver teeth) are determined.

The optimization can be based on achieving the overall minimum combined engagement pulse, or on achieving engagement pulses within a tolerance specified by the customer.

The foregoing disclosure includes the best mode devised by the inventor for practicing the invention. It is apparent, however, that several variations in the present invention may be conceivable by one skilled in the art. Inasmuch as the foregoing disclosure is intended to enable one skilled in the pertinent art to practice the instant invention, it should not be construed to be limited thereby, but should be construed to include such aforementioned variations.

What is claimed is:

1. An assisted steering system, comprising:
   a rack having a first set of rack teeth and a second set of rack teeth;
   a driver pinion having at least one driver pinion tooth fully engaged with at least one of the first set of rack teeth;
   a steering shaft operably connected to said driver pinion;
   a steering wheel operably connected to said steering shaft; and an assist pinion having at least one assist pinion tooth partially engaged with at least one of the second set of rack teeth.

2. The steering system of claim 1, further comprising an assist motor operably connected to said assist pinion.

3. The steering system of claim 1, wherein said driver pinion has a first rack speed and said assist pinion has a second rack speed; and wherein said first rack speed is different than said second rack speed.

4. The steering system of claim 1, wherein said driver pinion has a plurality of driver pinion teeth and said rack pinion has a plurality or rack pinion teeth; and wherein the number of teeth in said plurality of driver pinion teeth is different than the number of teeth in said plurality of rack pinion teeth.

5. The steering system of claim 1, wherein said at least one driver pinion tooth defines first and second side surfaces;

wherein said at least one assist pinion tooth defines third and fourth side surfaces;

wherein said at least one of said first set of rack teeth defines a fifth side surface;

wherein said at least one of said second set of rack teeth defines a sixth side surface;

wherein said first side surface is in continuous contact with a portion of said fifth side surface that is adjacent said at least one driver pinion tooth; and wherein said third side surface is only partially contacted with a portion of said sixth side surface that is adjacent said at least one assist pinion tooth.

6. The steering system of claim 1, further comprising means for controlling said means for inducing.

7. The steering system of claim 6, wherein said means for controlling comprise a sensor adapted to detect a positional characteristic of said steering wheel or said steering shaft.

8. The steering system of claim 7, wherein said positional characteristic is a steering angle.

9. An assisted steering system, comprising:

a rack having a first set of rack teeth and a second set of rack teeth;

a driver pinion having at least one driver pinion tooth fully engaged with at least one of the first set of rack teeth;

a steering shaft operably connected to said driver pinion;

a steering wheel operably connected to said steering shaft;

an assist pinion having at least one assist pinion tooth partially engaged with at least one of the second set of rack teeth; and means for inducing alternating engagement and disengagement of said at least one assist pinion tooth with said second set of rack teeth.

10. The steering system of claim 9, wherein the means for inducing comprises an assist motor operably connected to said assist pinion.

11. The steering system of claim 9, wherein said driver pinion has a first rack speed and said assist pinion has a second rack speed; and wherein said first rack speed is different than said second rack speed.

12. The steering system of claim 9, wherein said driver pinion has a plurality of driver pinion teeth and said rack pinion has a plurality of rack pinion teeth; and wherein the number of teeth in said plurality of driver pinion teeth is different than the number of teeth in said plurality of rack pinion teeth.

13. The steering system of claim 9, wherein said at least one drive pinion tooth defines first and second side surfaces;

wherein said at least one assist pinion tooth defines third and fourth side surfaces;

wherein said at least one of said first set of rack teeth defines a fifth side surface;

wherein said at least one of said second set of rack teeth defines a sixth side surface;

wherein said first side surface is in continuous contact with a portion of said fifth side surface that is adjacent said at least one driver pinion tooth; and wherein said third side surface is only partially contacted with a portion of said sixth side surface that is adjacent said at least one assist pinion tooth.

14. An electric power assisted steering system, comprising:

a rack having a first set of rack teeth and a second set of rack teeth, a first rack tooth of said first set defining a first side surface and a second rack tooth of said second set defining a second side surface;

a driver pinion having a plurality of driver pinion teeth, at least one of said plurality of driver pinion teeth having a third side surface in continuous contact with a portion of said first side surface that is adjacent said at least one of said plurality of driver pinion teeth;

an assist pinion having a plurality of assist pinion teeth, at least one of said plurality of assist pinion teeth having a fourth side surface in only partial contact with a portion of said second side surface that is adjacent said at least one of said plurality of assist pinion teeth;

a steering shaft operably connected to said driver pinion;

a steering wheel operably connected to said steering shaft; and an assist motor operably connected to said assist pinion.

15. The steering system of claim 14, wherein said driver pinion has a first rack speed and said assist pinion has a second rack speed; and wherein said first rack speed is different than said second rack speed.

16. The steering system of claim 15, wherein said driver pinion has a plurality of driver pinion teeth and said rack pinion has a plurality of assist pinion teeth; and wherein the number of teeth in said plurality of driver pinion teeth is different than the number of teeth in said plurality of assist pinion teeth.

* * * * *

UNITED STATES PATENT AND TRADEMARK OFFICE
CERTIFICATE OF CORRECTION

PATENT NO.     : 6,705,421 B2
DATED          : March 16, 2004
INVENTOR(S)    : Sunil Palakodati et al.

It is certified that error appears in the above-identified patent and that said Letters Patent is hereby corrected as shown below:

<u>Column 5,</u>
Line 33, delete "claim 1," and substitute -- claim 9, -- in its place.

Signed and Sealed this

Seventeenth Day of August, 2004

JON W. DUDAS
*Acting Director of the United States Patent and Trademark Office*